United States Patent [19]
Jonasson

[11] 3,742,240
[45] June 26, 1973

[54] METER FOR MEASURING TANNING CAPABILITY OF SUNLIGHT

[75] Inventor: Oliver Joseph Jonasson, Edmonton, Alberta, Canada

[73] Assignee: Sundial Manufacturing Corporation Limited, Edmonton, Alberta, Canada

[22] Filed: Jan. 8, 1971

[21] Appl. No.: 104,928

[52] U.S. Cl. ............................................. 250/372
[51] Int. Cl. ............................................. G01j 1/42
[58] Field of Search ................... 250/83 R, 83.3 UV

[56] References Cited
UNITED STATES PATENTS
2,531,000  11/1950  Scott ........................... 250/83.3 UV
3,366,789  1/1968  Allen ........................... 250/83.3 UV
2,114,163  4/1938  Bird ........................... 250/83.3 UV X Primary Examiner—Archie R. Borchelt
Attorney—Ernest Peter Johnson

[57] ABSTRACT

The meter comprises a housing having a pair of angularly disposed apertures formed therein. A selenium photovoltaic barrier layer cell is mounted beneath each aperture. The cells are connected in parallel to a microammeter for measuring the current generated by them. A filter is provided over each aperture. This filter is adapted to pass only ultraviolet radiation having wavelengths between 300 and 390 millimicrons in amounts which are proportional to their tanning effectiveness and relative abundance. The reading given by the microammeter gives a measure of the tanning capability of sunlight at any given moment.

7 Claims, 6 Drawing Figures

PATENTED JUN 26 1973
3,742,240
SHEET 1 OF 3
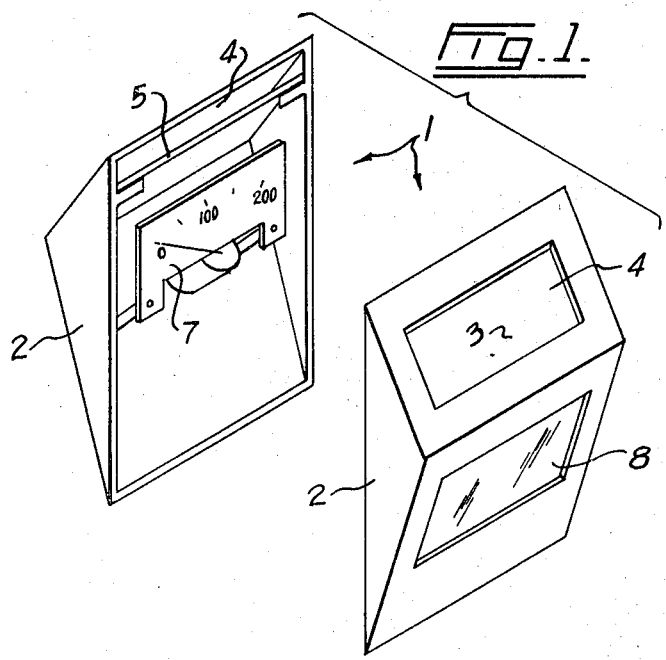
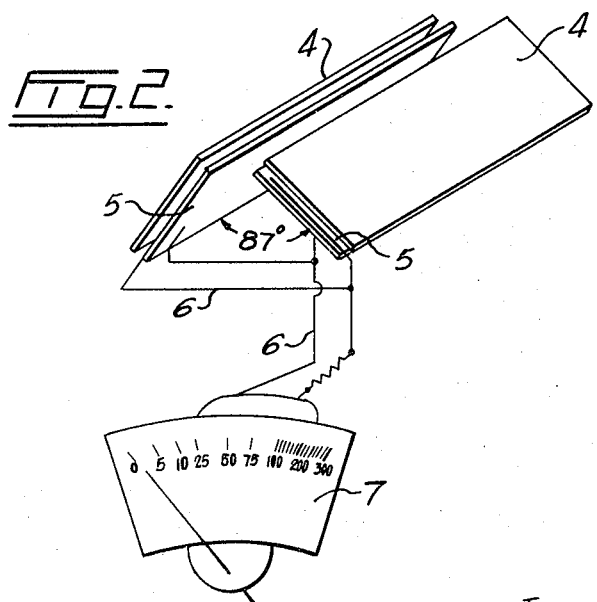
INVENTOR:
OLIVER JOSEPH JONASSON
AGENT:
Ernst Peter Johnson

INVENTOR:
OLIVER JOSEPH JONASSON

AGENT:
Ernest Peter Johnson

METER FOR MEASURING TANNING CAPABILITY OF SUNLIGHT

BACKGROUND OF THE INVENTION

This invention relates to a meter for providing a measure of solar ultraviolet radiation. More particularly, it relates to a meter which provides a measure of the relative tanning effectiveness of direct and indirect sunlight.

Tanning of human skin is produced by exposure to ultraviolet waves having wavelengths within the range 300 – 390 millimicrons. The shorter waves within this range cause rapid tanning; however they are only present in sunlight in relatively small amounts. The longer waves are more abundant; however their tanning power is relatively weaker. Such factors as atmospheric density, temperature, humidity, time of day and altitude all have an effect on the intensity of solar radiation and the proportions of waves of different length within it.

Due to the constant variation in the tanning power of sunlight, sunbathers and individuals with sensitive skins would find good use for a simple, inexpensive meter which could provide an indication of the said power at any given moment. To my knowledge, no such meter has previously been available.

SUMMARY OF THE INVENTION

It is therefore an object of this invention to provide a meter which is adapted to give a measure of the tanning effectiveness of solar radiation.

It is another object to provide a meter of this type which is simple and inexpensive.

It is another object to provide a meter of this type which gives a measure of the cumulative tanning effectiveness of both direct sunlight and skylight.

Broadly stated, the invention comprises combining a filter having particular transmission characteristics with a light sensitive instrument adapted to indicate the quantity of ultraviolet radiation passing through the filter. The filter must meet two requirements: It must pass only waves of solar ultraviolet radiation having wavelengths between about 300 and 390 millimicrons. Additionally, the waves that are passed must only pass in amounts which are substantially proportional to their tanning effectiveness and relative abundance.

In greater detail, the meter includes a housing defining at least one opening. Preferably, the housing has two angularly disposed openings oriented to have an interior angle of about 87° – 90° between them. Selenium photovoltaic barrier layer cells are mounted within the housing adjacent to each opening. The cells are suitably connected to a microammeter or equivalent means for providing a measure of the current generated in the cells. A filter, having a transmission characteristic substantially the same as that defined by curve 1 in FIG. 6 hereunder, fills each opening. Such a filter is commercially available from the Corning Glass Works, Corning, New York, United States of America, under the designation Color Glass Filter no. 5840.

In operation, the meter is held with one opening aimed at the sun. Direct solar ultraviolet radiation passes through the filter over this opening and generates a current in the cell. Similarly, ultraviolet radiation from skylight passes through the filter over the other opening and generates a current in the second cell. The cells are connected in a parallel circuit to a microammeter. It registers a measure of the cumulative current which is generated. This reading provides an indication of the relative tanning power of the sunlight.

The key feature of the device is the filter material used. It must only pass waves which cause tanning of human skin and the quantity of energy of any particular wavelength which is passed must depend on the relative tanning effectiveness and abundance of the waves involved. It will be appreciated that the barrier cells are responsive to the amount of energy to which they are exposed; if the passage of waves is not restricted as described, inordinately high readings are registered by the microammeter.

The meter in accordance with the invention comprises the following: light sensitive means adapted to generate electrical energy when exposed to ultraviolet radiation, the amount of energy being proportional to the amount of radiation; a housing enclosing the light sensitive means to shield it from radiation, said housing defining one or more openings to allow ultraviolet radiation to pass therethrough to reach said light sensitive means; energy measuring means, associated with said light sensitive means, adapted to provide a measure of the amount of energy generated; and a filter filling each opening, said filter being adapted to pass only that portion of ultraviolet radiation which tans human skin, said filter having a transmission characteristic such that wavebands are allowed to pass therethrough in amounts substantially proportional to their relative abundance and tanning effectiveness.

BRIEF DESCRIPTION OF THE DRAWING

In the drawings:

FIG. 1 is a perspective view of the meter which has been split longitudinally to display its interior;

FIG. 2 is a schematic view of certain elements of the meter;

DESCRIPTION OF THE PREFERRED EMBODIMENT

Figure 3:
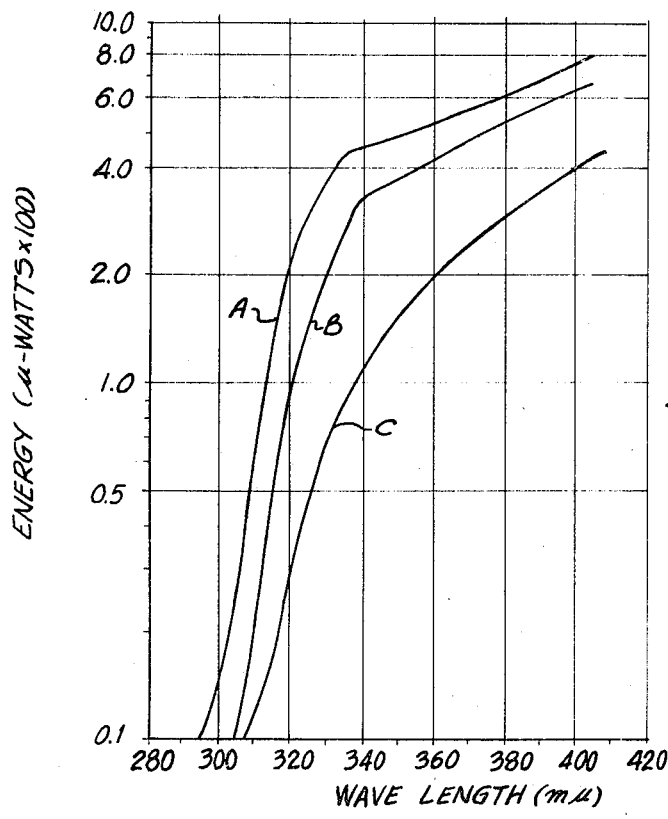
FIG. 3 is a chart illustrating the distribution of waves of different length in solar ultraviolet radiation — the data for curves A, B and C were recorded at the same time on days in June, May and March respectively.

Referring now to FIGS. 1 and 2, a meter 1 is shown. The meter 1 includes a plastic housing 2 having a pair of angularly disposed openings 3 formed therein. A filter 4, mounted within the housing 2, extends across each opening 3. A selenium photovoltaic barrier layer cell 5 is mounted within the housing 2 just below each of the filters 4. The cells 5 are connected in parallel by the leads 6 to a microammeter 7 mounted within the housing 2. A window 8, formed in housing 2, provides a view of the microammeter 7.

Let us now consider the selection of the filter material.

The relative tanning capability of solar radiation is established by determining the relative abundance of narrow wave bands, within the range 300 - 390 millimicrons, and the relative tanning effectiveness of each of these wavebands, and combining this information to give a measure of the capability. A curve is developed from the information. This curve defines the transmission characteristic of the filter material.

To determine the relative abundance of any narrow waveband, a photo-voltaic cell is covered with an interference filter which allows only that band to pass. The current generated in the cell is recorded. A curve, such as curves A, B and C in FIG. 3, is developed from this data.

I prepare these relative abundance curves by connecting a selenium photovoltaic cell (as sold by Mori Physics and Chemistory Laboratory Co., Ltd., Yokohama, Japan under the designation Moririca Type B–1) with a 250 full scale microammeter. The cell opening is covered with double thickness of a Corning color glass filter no. 9863 to shield it from visible light. A series of narrow band interference filters are inserted sequentially between the visible light filter and the cell to allow only a predetermined waveband of ultraviolet within the range 300 - 390 millimicrons to pass. The data obtained are plotted as in FIG. 3.

To determine the relative tanning effectiveness of the wavebands described in the preceding paragraph, one can begin by taping a shield, such as a piece of cardboard having a series of spaced holes formed therein, to the untanned arm of a human subject. Each opening is covered with a different interference filter. The arm is then exposed to sunlight and the time required to register a perceptible tan through the filter is recorded. The recorded exposure times are normalized by correcting for the relative amount of ultraviolet energy within each waveband interval. The normalized times are plotted against wavelengths to provide a curve such as that described in FIG. 4.

Figure 4:
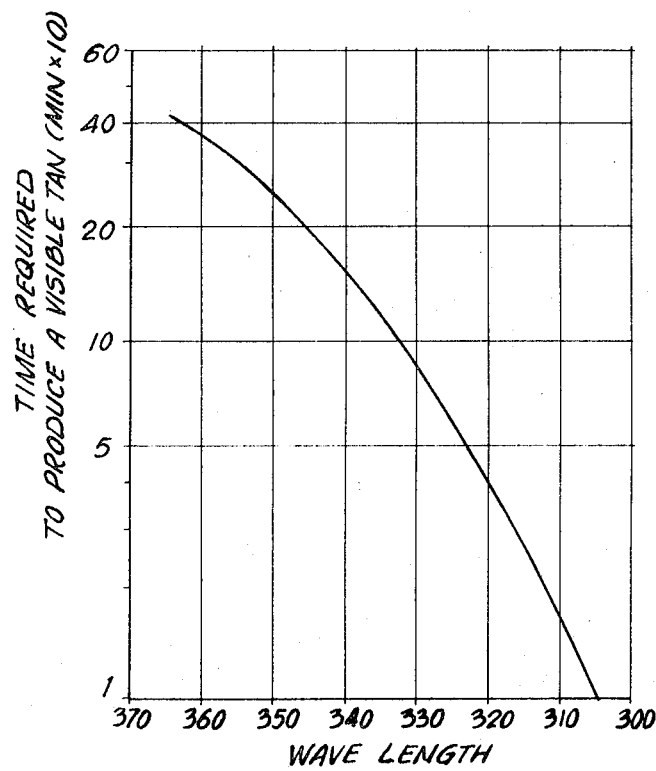
FIG. 4 is a chart illustrating the relative tanning effectiveness of various wavelengths of solar ultraviolet radiation, determined by the length of time required to produce a visible tan in human skin.
Figure 5:
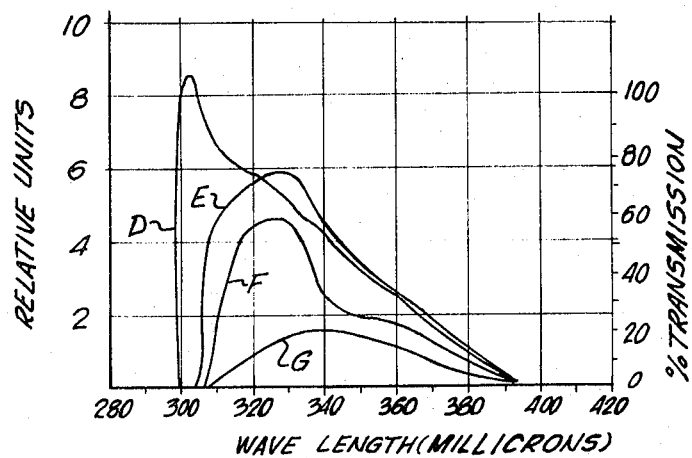
FIG. 5 is a chart illustrating the tanning effectiveness of solar ultraviolet radiation under different selected conditions — Curve D was recorded on a June day at noon with high cirrus clouds present, Curve E was recorded on a May day at noon with high cirrus clouds present, Curve F was recorded on a clear April day at noon and Curve G was recorded on a clear February day at noon.

Weighted tanning curves, such as curves D, E, F and G in FIG. 5, are then developed. These curves reflect both the relative abundance of particular wavebands and their relative tanning effectiveness. The values used to plot these curves are obtained by multiplying X by 1/Y where:

X = the averaged quantity of ultraviolet radiation in one of the narrow wavebands plotted in FIG. 3 in microwatts/square centimeter/second, Y = the time, in minutes, needed to establish a perceptible tan with the required waveband, as recorded in FIG. 4.

To illustrate, for curve E, FIG. 5, the energy detected in the first interval (305 - 315 millimicrons) is 69 microwatts/square centimeter. From FIG. 4, the respective average time to produce a visible tan for this interval is 17 minutes. Therefore, 69 microwatts/square centimeter X 1/17 minutes = 4.06 microwatts/square centimeter/minute. The energy detected in the next interval (310 to 323 millimicrons) is 121 microwatts/square centimeter and the respective time for this interval from FIG. 3 is 28 minutes. Therefore, 121 microwatts/square centimeter X 1/28 minutes = 4.30 microwatts/square centimeter/minute.

These values are plotted midway in the respective wavelength interval and joined by a line.

Figure 6:
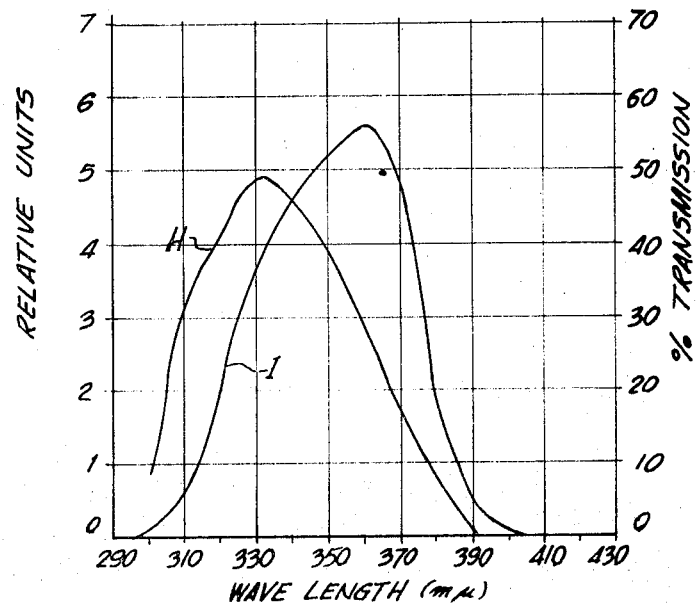
FIG. 6 is a chart showing an average tanning effectiveness curve H based on the curves of FIG. 5 and a curve I showing the transmission characteristics of Corning filter no. 5840.

The weighted tanning curves are then averaged to provide curve H in FIG. 6. This curve H defines the desirable transmission characteristics of the filter to be used in the meter. More specifically, curve H is obtained by averaging the waveband values of the various weighted tanning curves to determine the end points and peak of curve H. Any filter having a transmission curve with end points and peak substantially corresponding to curve H in FIG. 6 is suitable for use in the meter.

The material which, to my knowledge, best replicates the transmission characteristics defined by curve H in FIG. 6, and which is commercially available, is that sold by Corning under the designation Color Glass Filter no. 5840. The transmission characteristics of this filter are depicted by curve I in FIG. 6.

Those skilled in the art will appreciate that other filters can be developed or are available which have transmission characteristics similar to those exemplified in curve H of FIG. 6. The scope of this invention is intended to extend to any filter which serves to transmit ultraviolet radiation within the range 300 - 390 millimicrons in a manner which is correlated to the tanning responsiveness of human skin, as is the case with curve H of FIG. 6.

Calibration of a master model of the meter can be carried out in sunlight using 12 persons with normal white untanned skin. The upper forearm of each subject is covered with a cardboard square which has two parallel rows of five holes, each hole being approximately 5 mm in diameter and spaced about 5 mm from the adjacent one for easy comparison of the tanned spots. Four groups of three individuals are studied under different intensities of solar radiation on a clear June or July day. The first group is exposed to sunlight during the interval from 10 a.m. to noon. A pair of spots each is covered at 20, 40, 60, 100 and 120 minutes with meter readings taken every 10 minutes and averaged over the intervals as required. The second group is tested during the time from noon to 1 p.m. with exposure intervals of 10, 20, 30, 40 and 60 minutes. The remaining two groups are exposed from 1 p.m. to 3 p.m. (exposure intervals of 20, 40, 60, 90 and 120 minutes) and from 3 p.m. to 6 p.m. (exposure intervals of 30, 60, 90, 120 and 180 minutes) respectively. The degree of development of tan is observed 24, 48 and 72 hours following exposure and compared to the meter deflections during the respective exposure intervals. Erythema (or sunburn) is noted after 8 and 24 hours and related also to the meter deflections. From this data a table is constructed with suggested exposure times for various meter readings in order to efficiently obtain a smooth coat of tan.

What is claimed is:

1. A meter suitable for measuring the cumulative tanning capability of both direct sunlight and skylight according to both the relative abundance and the relative tanning effectiveness of particular wavebands therein, which comprises:

a. a housing defining two openings angularly positioned at an interval angle of about 90° to each other;

b. a filter filling each opening, said filter being adapted to pass only ultraviolet radiation having a wavelength of 300-390 millimicrons and having transmission characteristics such that ultraviolet wavebands within said wavelength pass therethrough in amounts substantially proportional to their relative abundance and tanning effectiveness;

c. a pair of ultraviolet light sensitive means adapted to generate electrical energy responsive to ultraviolet radiation in an amount proportional to the amount of said ultraviolet radiation, said light sensitive means being shieldingly enclosed in said housing and mounted just below said filter so that only ultraviolet radiation passing thru said filter reaches said light sensitive means; and d. energy measuring means for visibly measuring the cumulative energy generated by both members of said pair of light sensitive means.

2. A meter according to claim 1 wherein said filter has a transmission characteristic curve having transmission cut-off points below about 300 m$\mu$ and above about 390 m$\mu$ and a transmission peak at about 330 m$\mu$ substantially corresponding to curve H shown in FIG. 6 of the Drawing.

3. A meter according to claim 2 wherein said filter is Corning No. 5840.

4. A meter according to claim 2 wherein said light sensitive means comprises a pair of selenium barier layer photoelectric cells.

5. A meter according to claim 2 wherein said energy measuring means is a microammeter.

6. A meter according to claim 2 wherein said openings are angularly positioned at an interval angle of 87°-90°.

7. A meter according to claim 2 wherein said light sensitive means are a pair of selenium barier layer photoelectric cells and wherein said energy measuring means is a microammeter.

* * * * *